(12) United States Patent
Hu et al.

(10) Patent No.: US 9,227,876 B2
(45) Date of Patent: Jan. 5, 2016

(54) HIGH DIELECTRIC CONSTANT MATERIAL

(75) Inventors: Wanbiao Hu, Canberra (AU); Melanie Kitchin, Wantirna (AU); Yun Liu, Florey (AU); Amanda Snashall, Fraser (AU); Raymond L. Withers, Narrabundah (AU); Lasse Noren, Campbell (AU)

(73) Assignee: THE AUSTRALIAN NATIONAL UNIVERSITY, Acton, Act (AU)

( * ) Notice: Subject to any disclaimer, the term of this patent is extended or adjusted under 35 U.S.C. 154(b) by 0 days.

(21) Appl. No.: 14/342,729

(22) PCT Filed: Sep. 14, 2012

(86) PCT No.: PCT/AU2012/001109
§ 371 (c)(1),
(2), (4) Date: Jun. 12, 2014

(87) PCT Pub. No.: WO2013/037010
PCT Pub. Date: Mar. 21, 2013

(65) Prior Publication Data
US 2014/0293506 A1    Oct. 2, 2014

(30) Foreign Application Priority Data
Sep. 16, 2011   (AU) .............................. 2011903822

(51) Int. Cl.
| C04B 35/478 | (2006.01) |
| H01G 4/12 | (2006.01) |
| C01G 23/00 | (2006.01) |
| C01G 23/047 | (2006.01) |
| C04B 35/462 | (2006.01) |
| C04B 35/626 | (2006.01) |
| C01G 33/00 | (2006.01) |

(52) U.S. Cl.
CPC ............ *C04B 35/478* (2013.01); *C01G 23/002* (2013.01); *C01G 23/047* (2013.01); *C01G 33/006* (2013.01); *C04B 35/462* (2013.01); *C04B 35/62695* (2013.01); *H01G 4/1218* (2013.01); *C01P 2002/30* (2013.01); *C01P 2002/50* (2013.01); *C01P 2002/72* (2013.01); *C01P 2006/40* (2013.01); *C04B 2235/3217* (2013.01); *C04B 2235/3224* (2013.01); *C04B 2235/3251* (2013.01); *C04B 2235/3258* (2013.01); *C04B 2235/3286* (2013.01); *C04B 2235/3298* (2013.01); *C04B 2235/6562* (2013.01)

(58) Field of Classification Search
CPC .................... C04B 35/462; C04B 2235/3232; C01G 23/002; H01G 4/1218
See application file for complete search history.

(56) References Cited

U.S. PATENT DOCUMENTS

| 8,217,256 | B2 * | 7/2012 | Uchida | .................. | C01G 31/00 136/239 |
| 2002/0045531 | A1 * | 4/2002 | Suzuki et al. | ................. | 501/98.4 |
| 2010/0175735 | A1 * | 7/2010 | Uchida | .................. | C01G 31/00 136/240 |

FOREIGN PATENT DOCUMENTS

CN              101186496 A        5/2008

OTHER PUBLICATIONS

The Written Opinion mailed Nov. 28, 2012 for corresponding International Application No. PCT/AU2012/001109, 5 pages.
Bechstein, Ralf et al., "Surface reconstruction induced by transition metal doping of rutile titanium dioxide," J. Phys. Chem. 2009;113:13199-13203.
Hirano, Masanori et al., "Effect of co-dopant on the formation and properties of anatase-type titania solid solutions doped with niobium," Journal of Physics and Chemistry of Solids 2011;72:661-666.
Stebbins, Jonathan F., "Aluminum substitution in rutile titanium dioxide: new constraints from high-resolution 27Al NMR," Chem. Mater. 2007;19:1862-1869.
Zhao, Q. et al., "The effect of additional doping with Nb, Al or Cu on ferromagnetism and conductivity in V-doped TiO2 powders," Physica B 2012;407:171-174.
The International Search Report mailed Nov. 28, 2012 for corresponding International Application No. PCT/AU2012/001109, 4 pages.
The International Preliminary Report on Patentability mailed Aug. 7, 2013 for corresponding International Application No. PCT/AU2012/001109, 6 pages.

* cited by examiner

Primary Examiner — Karl Group
(74) Attorney, Agent, or Firm — Fennemore Craig PC

(57) ABSTRACT

Disclosed herein is a material having formula $(A^{3+}_{((4-5n)/3)-\delta}B^{5+}n)xTi_{1-x}O_2$, wherein $0<n<0.8$, $\delta$ and $x$ is such that the material has a rutile structure, $0<n<0.8$, $\delta$ is between 0 and 0.025 inclusive, $A^{3+}$ is a trivalent positive ion and $B^{5-}$ is a pentavalent positive ion. A process for making the material, and its use as a dielectric material, are also described.

21 Claims, 8 Drawing Sheets

US 9,227,876 B2

HIGH DIELECTRIC CONSTANT MATERIAL

TECHNICAL FIELD

The present invention relates to dielectric materials and to processes for making them.

PRIORITY

This present application is a U.S. National Stage of PCT Application No. PCT/AU2012/001109 filed on Sep. 14, 2012, which claims priority from Australian provisional patent application number AU201190382, and the entire contents of each are incorporated herein by reference.

BACKGROUND

Driven by the need to develop high electrical energy storage devices and miniaturisation of electronic devices down to the micro and/or nanometer scale; increasing attention has been concentrated on the development of high or giant dielectric constant materials with good thermal stability and low dielectric loss.

To date, there are few materials systems which have a dielectric constant above $10^4$. Examples include $BaTiO_3$-like perovskite relaxor ferroelectric materials, such as $BaTi_{0.9}(Ni, W)_{0.1}O_3$, $Ba(Fe_{0.5}Ta_{0.5})O_3$, $(Ba, Sr)TiO_3$, $Ba(Ti, Sn)O_3$; $CaCu_3Ti_4O_{12}$ (CCTO) as well as analogous compounds like $CdCu_3Ti_4O_{12}$, $Bi_{2/3}Cu_3Ti_4O_{12}$ and $La_{0.5}Na_{0.5}Cu_3Ti_4O_{12}$ and Li (and/or K), and Ti (and/or V) co-doped NiO. In the first $BaTiO_3$-like perovskite system, the giant dielectric constant (about $10^3$-$10^4$) arises from their relaxor ferroelectric characteristics with a displacive diffuse transition in the vicinity of room temperature. The dielectric constant of materials of this type, however, is significantly temperature and frequency dependent with a relatively large dielectric loss. The giant dielectric constant of the second CCTO-type family of materials can reach up to about $10^5$. These CCTO-type materials have relatively better temperature stability since the high dielectric polarisation results from both relaxor ferroelectric and internal barrier layer capacitance (IBLC) contributions. The dielectric properties of materials of this type, however, are often strongly process-dependent. For example, the measured dielectric constant can vary over the range from a few hundred up to $10^5$. The doped NiO and $La_{2-x}Sr_xNiO_4$ ($x=\frac{1}{3}$ or $\frac{1}{8}$) systems are ones where the dielectric constant arises from IBLC or so called core-shell model contributions. This, again, however leads to a relatively high dielectric loss over a relatively broad temperature range.

There is therefore a need for a material which exhibits a giant dielectric constant but better temperature stability and significantly less dielectric loss by comparison with existing giant dielectric constant materials.

OBJECT

It is an object of the present invention to substantially overcome or at least ameliorate one or more of the above disadvantages. It is a further objective to at least partially satisfy the above need.

SUMMARY

In a first aspect of the invention there is provided a material having formula $(A^{3+}_{((4-5n)/3)-\delta}B^{5+}_n)_xTi_{1-x}O_2$. The material may have a rutile structure. It may have a single phase rutile structure. In this formula, $A^{3+}$ is a trivalent positive ion and $B^{5+}$ is a pentavalent positive ion. x should be between 0 and 1 (not inclusive, i.e. 0<x<1). It may be such that the material has a rutile structure. $\delta$ may be between 0 and 0.025 inclusive. n should be between 0 and 0.8 (not inclusive), and may be about 0.5.

The following aspects may be used in conjunction with the first aspect, either individually or in any suitable combination.

x may be between about 0 and about 0.2 (provided it is not exactly 0). It may be between about 0.0005 and 0.005. x may be such that the dielectric constant of the material is greater than about 10,000, or such that the dielectric constant of the material is between about 10,000 and 100,000 or between about 10,000 and 1,000,000. x may be for example 0.0005. It may be 0.005. It may be such that the material has a single phase rutile structure.

The material may have a dielectric constant of greater than about 10,000, or between about 10,000 and 100,000 or between about 10,000 and 1,000,000.

The material may have a dielectric loss of less than about 0.3 at about 20° C. The dielectric loss of less than about 0.3 may apply over a temperature range from about 20° C. to about 200° C. It may be maintained at less than 0.3 over a frequency range of about 100 Hz to about 1 MHz or of about 1 kHz to about 1 MHz or 1 kHz to 100 MHz.

The material may have a temperature coefficient of its dielectric constant of less than or equal to about 1900 ppm/° C. The temperature coefficient may be less than or equal to about 1900 ppm/° C. over a range of about 20° C. to about 250° C. The material may have a positive temperature coefficient of its dielectric constant over a range of about −100° C. to about +200° C. or of about −190° C. to about +200° C. (i.e. the coefficient may be positive throughout this range). It may have a temperature coefficient of its dielectric constant of less than about 650 ppm/° C. over the range of about −170° C. to about −20° C.

The colour of the material may be grey or may be dark yellow.

In a particular example the material has a dielectric constant of at least about 10,000 and dielectric loss of less than 0.3 at about 20° C. over a frequency range of about 100 Hz to about 1 MHz.

In the formula $(A^{3+}_{((4-5n)/3)-\delta}B^{5+}_n)_xTi_{1-x}O_2$, $A^{3+}$ may be $Bi^{3+}$, $In^{3+}$, $Ga^{3+}$, $Sc^{3+}$, $Co^{3+}$, $Cr^{3+}$, $Fe^{3+}$ or a trivalent positive ion of a rare earth element or it may be a mixture of any two or more of these. A further alternative for $A^{3+}$ is $Al^{3+}$. $B^{5+}$ may be $Nb^{5+}$, $Ta^{5+}$, $W^{5+}$, $V^{5+}$, $Mo^{5+}$, and $Sb^{5+}$ or it may be a mixture of any two or more of these.

The average structure of the material may be a rutile structure. It may be crystalline. The material may represent an acceptor-donor co-substitution onto the $Ti^{4+}$ sites in $TiO_2$ rutile.

In an embodiment the material is $(A^{3+}_{0.5-\delta}B^{3+}_{0.5})_xTi_{1-x}O_2$, wherein x is less than 0.2 and greater than 0 and $\delta$ is less than about 0.005, said material having a rutile structure.

In a particular example, the material is $(In_{0.5-\delta}Nb_{0.5})_xTi_{1-x}O_2$ (i.e. $(In^{3+}_{0.5-\delta}Nb^{5+}_{0.5})_xTi_{1-x}O_2$), where 0<x<0.15, for example 0.0005 to about 0.005, and $\delta$ is less than about 0.005. In other examples, $A^{3+}$ is $Al^{3+}$ and $B^{5+}$ is $Nb^{5+}$, whereby the material has formula $(Al^{3+}_{0.5-\delta}Nb^{5+}_{0.5})_xTi_{1-x}O_2$ or $(Al^{3+}_{0.083-\delta}Nb^{5+}_{0.75})_xTi_{1-x}O_2$.

The material may be in the form of pellets. In this case each pellet may be a single phase pellet.

In a second aspect of the invention there is provided a process for making a material of formula $(A^{3+}_{((4-5n)/3)-\delta}B^{5+}_n)_xTi_{1-x}O_2$ comprising:
  mixing $A_2O_3$, $B_2O_5$ and $TiO_2$ to form a mixture,
  compressing the mixture to form pellets, and annealing the pellets to form the material of formula $(A^{3+}_{0.5-\delta}B^{5+}_{0.5})_xT_{1-x}O_2$.

In the formula $(A^{3+}_{0.5-\delta}B^{5+}_{0.5})_xT_{1-x}O_2$, $0<x<1$ and x is such that the material has a rutile structure, $\delta$ is between 0 and 0.025 inclusive, n is between 0 and 0.8 inclusive, $A^{3+}$ is a trivalent positive ion and $B^{5+}$ is a pentavalent positive ion.

The following aspects may be used in conjunction with the second aspect, either individually or in any suitable combination.

x may be between about 0 and about 0.1 (provided it is not exactly 0). It may be between about 0.0005 and 0.005. x may be such that the dielectric constant of the material is greater than about 10,000, or such that the dielectric constant of the material is between about 10,000 and 100,000, or between about 10,000 and 1,000,000.

The process may be conducted in the solid state.

The step of annealing may be conducted in a closed furnace. It may be conducted at a temperature of between about 1300 to about 1500° C. It may be conducted for sufficient time to produce annealed pellets of formula $(A^{3+}_{(4-5n)/3)-\delta}B^{5+}_n)_xT_{1-x}O_2$. It may for example be conducted for at least about 2 hours or at least about 5 hours, or from about 2 to about 20 hours or from about 5 to 20 hours.

The molar ratio of $A_2O_3$, $B_2O_5$ and $TiO_2$ may be such that the process produces the material of formula $(A^{3+}_{((4-5n)/3)-\delta}B^{5+}_n)_xTi_{1-x}O_2$. The molar ratio of $A_2O_3$ to $B_2O_5$ may be about 1:1 or, more generally, (4-5n):3n. The molar ratio of $A_2O_3$ plus $B_2O_5$ to $TiO_2$ may be about (x/2):(1-x) or ((2-3n)x/3):(1-x).

In a particular example, A is In, B is Nb, n is 0.5 and the step of annealing is conducted at about 1450° C. for about 10 hours, whereby the process makes $(In^{3+}_{0.5-\delta}Nb^{5+}_{0.5})_xTi_{1-x}O_2$, where $0<x<0.1$.

The invention also encompasses a material made by the second aspect. The material made by the second aspect may be according to the first aspect.

In a third aspect of the invention there is provided a capacitor comprising a material according to the first aspect, or made by the process of the second aspect, when used as a dielectric material.

In a fourth aspect of the invention there is provided use of a material according to the first aspect, or a material made by the process of the second aspect, as a dielectric material.

In a fifth aspect of the invention there is provided use of a material according to the first aspect, or a material made by the process of the second aspect, for the manufacture of a capacitor.

In a sixth aspect of the invention there is provided a process for making a capacitor comprising locating a material according to the first aspect, or a material made by the process of the second aspect, between two electrically conductive terminals.

BRIEF DESCRIPTION OF THE DRAWINGS

A preferred embodiment of the present invention will now be described, by way of an example only, with reference to the accompanying drawings wherein.

DETAILED DESCRIPTION

Figure 1:
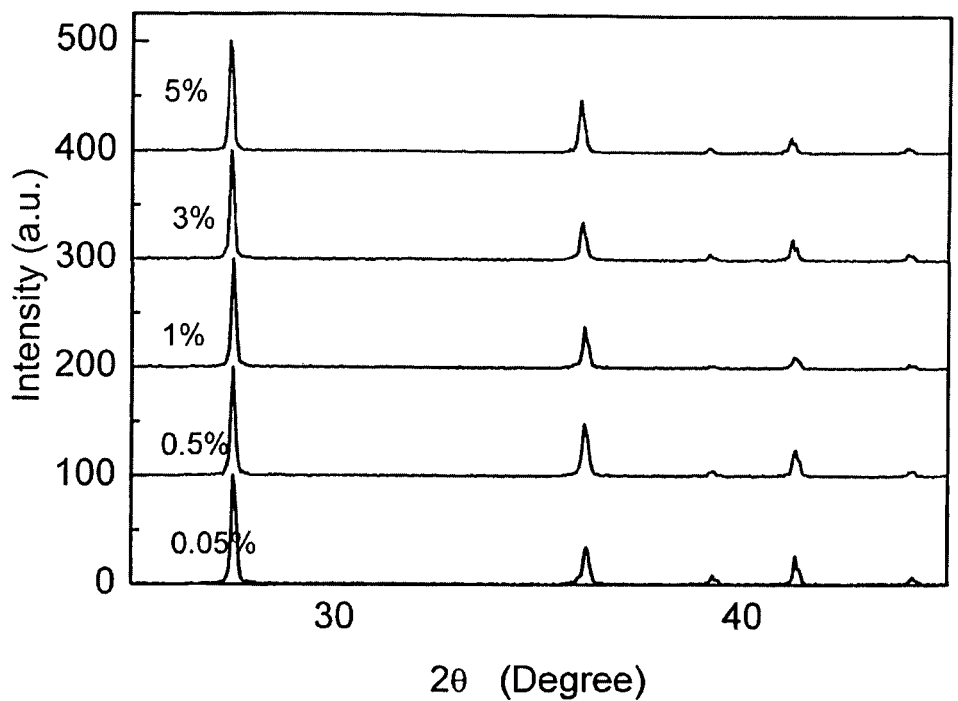
FIG. 1 shows X-ray diffraction patterns of doped $TiO_2$ rutile at room temperature.

The invention relates to materials of chemical formula $(A^{3+}_{((4-5n)/3)-\delta}B^{5+}_n)_xTi_{1-x}O_2$, commonly approximately $(A^{3+}_{0.5-\delta}B^{5+}_{0.5})_xTi_{1-x}O_2$. The materials of the invention have a rutile structure, commonly a single phase rutile structure. In this formula, the Ti is at least partly in the +4 oxidation state (commonly almost entirely in the +4 oxidation state), and may also be partially in the +3 oxidation state. The materials may be regarded as "doped" titanium dioxides, in which the dopants are $A_2O_3$ and $B_2O_5$, commonly (although not necessarily) in approximately equimolar amounts. Definitions of the variables in this formula are set out below.

A: this is an element capable of forming a +3 ion. Suitable examples include Sc, Y, lanthanides (also known as rare earths—La, Ce, Pr, Nd, Pm, Sm, Eu, Gd, Tb, Dy, Ho, Er, Tm, Yb, Lu), Al, Bi, Ga, In, Cr, Co and Fe. Mixtures of any two or more, in any desired ratio, may also be used. For example the material may for example have formula $(A_a^{3+}_{y-\delta}A_b^{3+}_{0.5-y-\in}B^{5+}_{0.5})_xTi_{1-x}O_2$, in which $0\leq y\leq(0.5-\in)$ (i.e. y is between 0 and $0.5-\in$ inclusive) and x is such that the material has a rutile structure (in many cases $0<x<0.15$, or $0<x<0.1$, commonly $0.0005<x<0.005$) and $A_a$ and $A_b$ are different examples of A from the list above. In this case $\delta+\in$ is between about 0 and 0.025 inclusive and both $\delta$ and $\in$ are positive numbers or 0. It will be understood that in the more general case where there are n moles of $B^{5+}$ per mole of the material (rather than specifically 0.5 moles), the above formula will be adjusted accordingly. In that case, y should be between 0 and $(4-5n)/3$. $A^{3+}$ may be an electron acceptor. A may be a stronger electron acceptor than Ti.

B: this is an element capable of forming a +5 ion. Suitable examples include Nb, Ta, W, V, Mo, and Sb. Mixtures of any two or more of these may also be used. For example the material may have formula $(A_a^{3+}_{y-\delta}A_b^{3+}_{0.5-y-\in}B_c^{5+}_{0.5-z}B_d^{5+}_z)_xTi_{1-x}O_2$, in which $0\leq y\leq0.5$, $0\leq z\leq0.5$ (i.e. both y and z are between 0 and 0.5 inclusive), x is such that the material has a rutile structure (in many cases $0<x<0.15$, or $0<x<0.1$, or $0.0005<x<0.005$), $A_a$ and $A_b$ are different examples of A from the list of options for A above and $B_c$ and $B_d$ are different examples of B from the list of options for B above. In this case again, $\delta+\in$ is between about 0 and 0.025 inclusive. Again, as discussed above, the above formula may be generalised for cases in which n is not 0.5 $B^{5+}$ may be an electron donor. B may be a stronger electron donor than Ti.

In the above formulae, if present, y and z may, independently, be anywhere between 0 and 0.5, or about 0 to 0.3, 0 to 0.1, 0.1 to 0.5, 0.2 to 0.5, 0.1 to 0.4 or 0.2 to 0.3, e.g. about 0, 0.05, 0.1, 0.15, 0.2, 0.25, 0.3, 0.35, 0.4, 0.45 or 0.5, with the proviso that neither y nor z may be such that the coefficient in which they appear is less than 0.

Preferably A and B are such that the material is stable. They may be such that $A^{3+}$ does not reduce $B^{5+}$ during formation of the material or in the material itself.

x: this should be such that the material has a rutile structure. Also, it should be such that $0<x<1$, so that the material is not pure titanium dioxide but does contain titanium. Thus x is such that the material may be seen as a titanium dioxide of rutile structure, doped with A and B. It may be equal to or less than about 0.2 or equal to or less than about 0.15 or equal to or less than about 0.1. It may be less than or equal to 0.05, 0.02, 0.01, 0.005, 0.002, 0.001, 0.0005 or 0.0002, provided that it is greater than 0 (so that $A^{3+}$ and $B^{5+}$ are both present in the material). x may be about 0.0001 to about 0.1 or about 0.0001 to 0.001, 0.0001 to 0.0005, 0.0005 to 0.005, 0.0005 to 0.05, 0.005 to 0.05 or 0.001 to 0.01 e.g. about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.015, 0.02, 0.025, 0.03, 0.035, 0.04, 0.045, 0.05, 0.055, 0.06, 0.065, 0.07, 0.075, 0.08, 0.085, 0.09, 0.095 or 0.1. The limits to the value of x will depend on the nature of A and B. For a particular value of x, it may be readily determined, for example by x-ray diffraction, whether the resulting ceramic has the required single phase rutile structure and hence whether that value of x is appropriate for the particular choice of A and B. The value of x may also depend on the value of n (see below) i.e. on the ratio of A and B in the material.

$\delta$: this is less than 0.025 and may on occasions be effectively 0. The inventors have found that, whereas nominally the titanium is in the +4 oxidation state, very small amounts (typically less than about 1%) may be reduced to the +3 oxidation state. In order to compensate for this, small amounts of the $A^{3+}$ ion may be lost or oxygen vacancy may need to be created. The factor $\delta$ reflects this loss. Thus $\delta$ is generally less than about 5% of the amount of $A^{3+}$, i.e. less than about 0.025 (which is 5% of 0.5). It may be less than about 0.02, 0.015, 0.01, 0.005, 0.004, 0.003, 0.002, 0.001 or 0.0005. Typical values of $\delta$ are for example 0.0001, 0.0002, 0.0003, 0.0004, 0.0005, 0.0006, 0.0007, 0.0008, 0.0009, 0.001, 0.002, 0.003, 0.004, 0.005, 0.1, 0.015, 0.02 or 0.025. $\delta$ may be effectively zero, in which case effectively all of the Ti is in the +4 oxidation state.

n: this is commonly around 0.5, however in cases in which n is not 0.5, the material has unequal molar amounts of $A^{3+}$ and $B^{5+}$. n may be between about 0 and about 0.8 (but in no case 0 or less, or 0.8 or more), or between about 0 and 0.5 or 0.5 and 0.8 or 0.4 and 0.6 or 0.55 and 0.65 or 0.4 and 0.5 or 0.5 and 0.6, e.g. about 0, 0.05, 0.1, 0.15, 0.2, 0.25, 0.3, 0.35, 0.4, 0.45, 0.5, 0.55, 0.6, 0.65, 0.7, 0.75 or 0.8. The range for n must also be adjusted to ensure that the coefficients for the different ions are greater than 0.

In the formulae above, e.g. in the formula $(A^{3+}_{((4-5n)/3)-\delta}B^{5+}_n)_x Ti_{1-x} O_2$, it should be recognised that the subscripts represent ratios of numbers of atoms or ions present in the material and do not suggest that fractional atoms or ions are actually present. It should also be recognised that the formula represents an empirical formula for a substance which may not be homogeneous. There may for example be localised regions with different ratios of atoms/ions. In particular, there may be different concentrations of particular atoms/ions in grains compared to at grain boundaries. The inventors have found that $A^{3+}$ ions can in some cases be in higher than average concentration at and/or near grain boundaries.

The material may have a dielectric constant of greater than about 10,000, or greater than about 11,000, 12,000, 13,000, 14,000, 15,000, 16,000, 17,000, 18,000, 19,000 or 20,000, or of about 10,000 to about 30,000, or about 10,000 to 20,000, 10,000, to 15,000, 10,000 to 12,000, 10,000 to 11,000, 11,000 to 30,000, 15,000 to 30,000, 20,000 to 30,000, 11,000 to 15000, 11,000 to 13000 or 15,000 to 20,000, e.g. about 10,000, 10,500, 11,000, 11,500, 12,000, 12,500, 13,000, 13,500, 14,000, 14,500, 15,000, 16,000, 17,000, 18,000, 19,000, 20,000, 21,000, 22,000, 23,000, 24,000, 25,000, 26,000, 27,000, 28,000, 29,000 or 30,000. In some cases the dielectric constant may be above 30,000, e.g. about 35,000, 40,000, 45,000, 50,000, 60,000, 70,000, 80,000, 90,000 or 100,000. Particular examples of these materials have dielectric constants above 100,000, and may have a dielectric constant over 200,000, 300,000, 400,000, 500,000, 600,000, 700,000, 800,000, 900,000 or 1,000,000. Thus the dielectric constant may be between about 10,000 and about 1,000,000, or 100,000 to 1,000,000 or 100,000 to 500,000 or 500,000 to 1,000,000, e.g. about 200,000, 300,000, 400,000, 500,000, 600,000, 700,000, 800,000, 900,000 or 1,000,000.

The material may have a dielectric loss of less than about 0.3 at about 20° C. or less than about 0.25, 0.2, 0.15 or 0.1, e.g. about 0.05 to 0.3, 0.1 to 0.3, 0.2 to 0.3, 0.1 to 0.25 or 0.15 to 0.25. It may have a dielectric loss at about 20° C. of about 0.1, 0.15, 0.2, 0.25, 0.25, 0.27, 0.28, 0.29 or 0.3. The dielectric loss may be less than about 0.05 at about 20° C. or at about 27° C., or less than about 0.045, 0.04, 0.035, 0.3, 0.025 or 0.02, or may be about 0.1, 0.2 or 0.3 at these temperatures. The dielectric loss (or range thereof) as described above may apply over a temperature range from about 20° C. to about 200° C., or about 20 to 150, 20 to 100, 20 to 50, 50 to 200, 100 to 200, 150 to 200 or 50 to 150° C. It may for example apply at any one or more of the following temperatures: 20, 25, 30, 35, 40, 45, 50, 55, 60, 65, 70, 75, 80, 85, 90, 95, 100, 110, 120, 130, 140, 150, 160, 170, 180, 190 or 200° C. It may also apply at other temperatures outside the above ranges, e.g. at about 0, 5, 10, 15, 210, 220, 230, 240 or 250° C. It may apply from about −190 to about 250° C., or about −100 to 250, 0 to 250, 100 to 250, −190 to 100, −190 to 0, −190 to −100, −100 to 200, −100 to 0 or −50 to 150° C., e.g. about −190, −150, −100, −50, 0, 20, 50, 100, 150, 200 or 250° C. Suitable materials have dielectric loss of less than about 0.1, commonly less than about 0.05, across a temperature range of about −190 to about 200° C. or about −190 to about 250° C. The dielectric loss as described above may be maintained over a frequency range of about 100 Hz to about 1 MHz, or about 1 kHz to about 1 MHz, or about 1 to 500 kHz, 1 to 200, 1 to 100, 1 to 50, 1 to 20, 1 to 10, 10 to 200, 10 to 100, 10 to 50, 50 to 1000, 100 to 1000, 200 to 1000, 500 to 1000, 100 to 500, 100 to 300 or 200. to 500 kHz, e.g. about 1, 2, 3, 4, 5, 6, 7, 8, 9, 10, 20, 30, 40, 50, 100, 150, 200, 150, 300, 350, 400, 450, 500, 600, 700, 800, 900 or 1000 kHz. It may also be maintained beyond these ranges. In some instances the dielectric loss is maintained as described above up to about 100 MHz. It may therefore be maintained in the range of about 1 kHz to about 100 MHz, e.g. from about 1 to about 100 MHz, or about 1 to 50, 1 to 10, 10 to 100, 50 to 100 or 10 to 50 MHz, e.g. about 1, 2, 3, 4, 5, 10, 15, 20, 25, 30, 35, 40, 45, 50, 60, 70, 80, 90 or 100 MHz. Suitable materials therefore may maintain a dielectric loss of less than about 0.1, commonly less than about 0.05, over a range of about 100 Hz to about 1 MHz, or 1 kHz to about 100 MHz. From the above, it should be understood that any combination of dielectric loss, temperature range and frequency range, each within the ranges above, may apply. Where it is stated that the dielectric loss of less than about 0.3 applies over a particular temperature and/or frequency range, this does not necessarily indicate that a particular value of the loss applies over the whole range, but rather that over the whole range the loss is less than 0.3, even though there may be some variation within the range.

The material of the invention has a relatively constant dielectric constant over a range of temperatures. Thus over a selected temperature range it may have a temperature coefficient of its dielectric constant of less than or equal to about 2000 ppm/° C., or less than or equal to about 1900, 1500, 1200, 1000, 500, 200 or 100 ppm/° C. This coefficient (or range thereof) may be maintained over a range of about 20° C. to about 250° C., or about 20 to 200, 20 to 150, 20 to 100, 50 to 250, 100 to 250, 150 to 250, 100 to 200, 100 to 150 or 150 to 200° C. In particular it may apply at any one or more of the following temperatures: 20, 25, 30, 35, 40, 45, 50, 55, 60, 65, 70, 75, 80, 85, 90, 95, 100, 110, 120, 130, 140, 150, 160, 170, 180, 190 or 200° C. It may also apply at temperatures outside that range, e.g. at about 0, 5, 10, 15, 260, 270, 280, 290 or 300° C. It may apply from about −190 to about 250° C., or about −100 to 250, 0 to 250, 100 to 250, −190 to 100, −190 to 0, −190 to −100, −100 to 200, −100 to 0 or −50 to 150° C., e.g. about −190, −150, −100, −50, 0, 20, 50, 100, 150, or 200° C. The temperature range may be frequency dependent. Thus at low frequencies (e.g. around 100 Hz or less), the upper temperature limit may be lower, e.g. about 200° C. whereas at higher frequencies (i.e. greater than about 100 Hz) a higher upper temperature limit may be attainable, e.g. about 250° C. Higher frequencies may be useful in enabling the material to be used in radio frequency communication technology. Suitable materials have dielectric loss of less than about 0.1, commonly less than about 0.05, across a temperature range of −190 to about 200° C. The material may have a positive (or non-negative) temperature coefficient of its dielectric constant over a range of about −100° C. to about +200° C., or about −100 to +100, −100 to 0, 0 to +200, +100 to +200 or 0 to +100° C., e.g. it may have a positive (or non-negative) temperature coefficient of its dielectric constant at or about any one or more of the following temperatures: −100, −50, 0, +50, +100, +150 or +200° C. It may have a positive (or non-negative) temperature coefficient at temperatures outside the above ranges. It may have a temperature coefficient of its dielectric constant of less than about 650 ppm/° C., or less than about 600, 550, 500, 540, 400, 350, 300, 250, 200, 150 or 100 ppm/° C. (e.g. the coefficient may be about 600, 550, 500, 540, 400, 350, 300, 250, 200, 150 or 100 ppm/° C.). This may apply over the range of about −170° C. to about −20° C., or about −150 to −20, −100 to −20, −50 to −20, −170 to −50, −170 to −100, −100 to −50 or −150 to −100° C., e.g. at about, −170, −160, −150, −140, −130, −120, −110, −100, −90, −80, −70, −60, −50, −40, −30 or −20° C. It may also apply outside these ranges, e.g. at about 0, −5, −10, −15, −175, −180, −185, −190, −195 or −200° C.

The average structure of the material may be a rutile structure. The material may represent an acceptor-donor co-substitution onto the $Ti^{4+}$ sites in $TiO_2$ rutile. The average structure may have a space group $P4_2/mnm$. The material may be in the form of pellets. The term "pellet" may be taken to include all manner of pellet-like structures such as granules or grains or particles. In this case each pellet or granule or grain or particle may be a single phase pellet or granule or grain or particle. These may be spherical, or may be some other suitable shape, for example ovoid, ellipsoid, cubic, rhomboidal, prismatic, parallelepiped (for example rectangular parallelepiped), oblate spherical, acicular, fibrous, toroidal, polyhedral (with between about 6 and about 50 sides), platelet-shaped, rhomboidal or may be irregular shaped. Different pellets may have the same shape or may have different shapes. The pellets may have a diameter of about 5 to about 15 mm, or about 5 to 10, 10 to 15 or 8 to 12 mm, e.g. about 5, 6, 7, 8, 9, 10, 11, 12, 13, 14 or 15 mm. They may have a thickness of about 0.1 to 2 mm, or about 0.1 to 1, 0.1 to 0.5, 0.5 to 1 or 1 to 2 mm, e.g. about 0.1, 0.2, 0.3, 0.4, 0.5, 0.6, 0.7, 0.8, 0.9, 1, 1.5 or 2 mm. They may for example have a diameter of about 10 to about 12 mm and a diameter of about 1 mm.

Commonly the doping concentration is from about 0.05-10 mol %, commonly about 0.05-5 mol %, because higher doping concentrations frequently result in higher loss. As noted earlier, however, this limit may depend, on the ratio and nature of A and B. A suitable balance between dielectric constant, loss and temperature stability is required for practical applications. At this level of doping, it has been observed that the material retains a rutile structure, which is considered important for keeping dielectric loss low.

Tetravalent doping ions have not been found to be effective in the present invention because they only change the polarisability and are not capable of providing sufficient driving force to increase the dielectric constant up to the desired minimum of about $10^4$. Trivalent ion doping is capable of maintaining the dielectric constant as similar to that of pure $TiO_2$. Pentavalent ion doping is capable of significantly changing the material properties from insulating to semi-conducting and consequently can lead to very high loss. The inventors hypothesise that the underlying mechanism relates to:

(1) the donor-acceptor pairs can attain overall charge balance, however the pentavalent ions have a potential to locally induce the Ti ion valency change from $Ti^{4+}$ into $Ti^{3+}$. $Ti^{3+}$ has an unpaired electron which is localised to form dipoles and contribute to the observed dielectric constant; and (2) the doping ions create semi-conductive barrier layers in the grain boundary to form the internal barrier layer capacitors (IBLCs) and hence lead to the high dielectric constant.

The process for making the materials of the invention may be a solid state process. It may be a solvent free process. It may be conducted in the absence of solvents. It may be conducted without addition of substances other than the component oxides (see below). In order to make the materials of the invention, a mixture of component oxides $A_2O_3$, $B_2O_5$ and $TiO_2$ (where A and B are as defined above) is compressed compressing the mixture to form pellets. Thus the mixture may comprise, or may consist essentially of, $A_2O_3$, $B_2O_5$ and $TiO_2$. The mixing of the oxide components should be in suitable proportions that the final mixture has a molar ratio of A:B=((4-5n)/3):n, commonly 1:1. The proportions should be such that the ratio of (A+B):Ti is about x:(1-x). Thus the molar ratio of $A_2O_3$ to is $B_2O_5$ should be about ((4-5n)/3):n, commonly about 1:1. In the case where n is about 0.5, the molar ratio of $A_2O_3$ to $B_2O_5$ may be between about 0.9:1 and 1.1 to 1, or about 0.9:1 and 1:1, 1:1 and 1.1:1, 0.95:1 and 1.05:1, 0.95:1. and 1:1, 1:1 and 1.05:1, 0.99:1 and 1.01:1, 0.99:1 and 1:1, 1:1 and 1.01:1, 0.999:1 and 1.001:1, 0.999:1 and 1:1 or 1.001:1 and 1:1, e.g. about 0.9:1, 0.91:1, 0.92:1, 0.93:1, 0.94:1, 0.95:1, 0.96:1, 0.97:1, 0.98:1, 0.99:1, 0.995:1, 0.999:1, 1:1, 1.09:1, 1.08:1, 1.07:1, 1.06:1, 1.05:1, 1.04:1, 1.03:1, 1.02:1, 1.01:1, 1.005:1 or 1.001:1. For other values of n, the molar ratio will of course be correspondingly different. The actual weight ratio will depend on the atomic weights of A and B. The molar ratio of $A_2O_3$ and $B_2O_5$ combined to $TiO_2$ should be (x/2):(1-x). In many (but not all) instances, x is less than about 0.2. Consequently the molar ratio of $A_2O_3$ and $B_2O_5$ combined to $TiO_2$ will generally be 1:t, where t is greater than about 8. t may be for example greater than about 8, 9, 10, 12, 14, 16, 18, 20, 25, 30, 35, 40, 45, 50, 100, 200, 300, 400, 500 or 1000, or may be about 8 to about 1000 or about 8 to 1000, 8 to 500, 8 to 200, 8 to 100, 8 to 50, 8 to 20, 10 to 1000, 15 to 1000, 20 to 1000, 50 to 1000, 100 to 1000, 200 to 1000, 500 to 1000, 20 to 100, 50 to 100, 20 to 50 or 50 to 200, e.g. about 8, 9, 10, 11, 12, 13, 14, 15, 16, 17, 18, 19, 20, 21, 22, 23, 24, 25, 30, 35, 40, 45, 50, 60, 70, 80, 90, 100, 150, 200, 250, 300, 350, 400, 450, 500, 600, 700, 800, 900 or 1000. Again, the weight ratio will depend on the atomic weights of A and B. The component oxides ($A_2O_3$, $B_2O_5$ and $TiO_2$) may have similar grain sizes when forming the mixture. They may have grain sizes that do not vary from each other by more than about 30%. The mean grain size (i.e. grain diameter) may be of the order of microns.

The mixing of the component oxides to form the mixture may comprise combining and subsequent and/or simultaneous agitation (swirling, stirring, shaking, tumbling etc.). The agitation may be sufficient to generate a substantially homogeneous mixture. In this context, a homogeneous mixture is one in which the mole ratios of the elements A, B and Ti are substantially even through the mixture, i.e. the components are substantially evenly distributed through the mixture. The components may be mixed in any order, or all together, provided that the final mixture has the required composition as described above. The step of compressing may be conducted using a press (e.g. a hydraulic press), a mould, a pelletiser or some other suitable compression device. The compressing may be at a sufficient pressure to convert the mixture into pellets. It may be uniaxial compressing. It may be at a pressure of about 3 to about 15 tonnes, or about 3 to 10, 3 to 5, 5 to 15, 10 to 15 or 5 to 10 tonnes, e.g. about 3, 4, 5, 6, 7, 8, 9, 10, 11, 12, 13, 14 or 15 tonnes. It may be conducted at about room temperature, or at about 15 to about 30°, or about 15 to 20, 20 to 30 or 20 to 25°, e.g. about 15, 20, 25 or 30°.

The resulting pellets are then annealed in order to produce the final material. The step of annealing may be conducted in a closed furnace. A suitable furnace has chamber dimensions of about 15 mm×15 mm×15 mm. It may be conducted at a temperature of between about 1300 to about 1550° C., or about 1300 to 1500, 1300 to 1400, 1400 to 1500 or 1350 to 1450° C., e.g. at about 1300, 1310, 1320, 1330, 1340, 1350, 1360, 1370, 1380, 1390, 1400, 1410, 1420, 1430, 1440, 1450, 1460, 1470, 1480, 1490, 1500 or 1550° C. It may be conducted for sufficient time to produce annealed pellets of formula $(A^{3+}_{((4-5n)/3)-\delta}B^{5+}_n)_xTi_{1-x}O_2$. This may be accompanied with a minor loss of $A^{3+}$ ions, accounted for by the factor $\delta$ in the formula. It may for example be conducted for at least about 5 hours, or at least about 6, 7, 8, 9, 10 or 15 hours, or from about 5 to about 20 hours, or about 5 to 10, 10 to 20 or 10 to 15 hours, e.g. about 5, 6, 7, 8, 9, 10, 11, 12, 13, 14, 15, 16, 17, 18, 19 or 20 hours. Any combination of the above temperatures and times may be suitable in particular cases. The resulting pellets may for example have a mean diameter of about 9 mm and a thickness of about 0.6 mm.

The inventors have found that, although many suitable materials according to the invention have equal quantities of A and B, the ratio of A:B does not have to be exactly 1:1. A more important restriction is from the overall structure of the material: it should retain a single rutile phase. As long as the overall charge is balanced, therefore, n need not be 0.5 (i.e. A:B need not be 1:1). In the case of excess B (n>0.5), it is considered that there are $Ti^{4+}$—$Ti^{3+}$, $B^{5+}$—$Ti^{3+}$ or $B^{5+}$—$Ti^{3+}$-$A^{3+}$ conjunctions coexisting in the compound. In the case of less B (n<0.5), $Ti^{4+}$-$A^{3+}$, $B^{5+}$—$Ti^{3+}$ or $B^{5+}$—$Ti^{3+}$-$A^{3+}$ conjunctions coexist. In the equimolar case (n=0.5), there will be predominantly $B^{5+}$-$A^{3+}$-$Ti^{3+}$ conjunctions. It is recognised that $TiO_2$ has quite large capability to accommodate the 3+ cation via the shear planes where some cations occupy the interstices.

The inventors hypothesise an electron-pinned defect-dipole mechanism to explain the large dielectric constants of the materials described herein. In this mechanism, hopping electrons are captured and localized by designated lattice defect states ("pinning effect") to generate gigantic defect-dipoles and result in high-performance extremely large permittivity materials. The inventors therefore consider that they have created electron-pinned defect-dipoles in titanium oxides in a way that electrons are pinned surrounding the titanium oxygen polyhedra ($TiO_{(1-x)}$) with less freedom. As these electrons have more space (within a several polyhedra region) for motion in comparison to the electrons in atoms, the resultant dipoles are gigantic and the behaviors of these dipoles still behave like "intrinsic" lattice defect dipoles rather than free electron hopping. In order to achieve this the inventors introduced a donor substitution to ensure that the host is dominated by delocalized electrons originating from the reduction of the host atom nearby. The newly created oxygen vacancies or oxygen deficient environment (positive charge centres) are created by incorporating another acceptor heteroatom into the host lattice and then combining with originally delocalized electrons to form defect dipoles. Most importantly, the whole of designated material system is charge balanced, giving less flexibility to localization of the doping induced behaviours. As the most important consequence of the formation of such local defect-dipoles, apart from the very large permittivity, extremely low dielectric loss is obtained. It is hypothesised that this is because the electron is bonded by the locally created oxygen deficient environment to form a gigantic dipole which can respond to an external electrical field, rather than an electron hopping from one lattice site to another.

The material of the invention may be used as a high dielectric material in capacitors. Due to the very high dielectric constant, described earlier, the material is suitable for use in producing capacitors with very high capacitance, or else for use in producing very small capacitors. It also has a strong potential to be used in safe, high efficiency solid state energy storage devices, such as a super- and/or ultra-capacitor material.

The present invention therefore relates to new giant dielectric constant materials. Certain of these materials may be useful in the miniaturisation of electronic devices and/or in the fabrication of high electrical energy storage devices. They may have a dielectric constant of over 10,000 with a relatively low dielectric loss and moderately good temperature stability over a very broad temperature range. These properties are superior by comparison with existing materials systems performing a similar function The present invention is of significance as materials described herein display a giant dielectric constant over an broad temperature range, not uncommonly from liquid nitrogen temperature (about 77K) up to about 200° C. with the dielectric loss over this entire temperature range being less than about 0.3.

The invention relates generally to modified rutile type electroceramics, e.g. $(In,Nb,Ti)O_2$, and their use as a giant dielectric constant material. The inventors disclose herein a design strategy for producing significantly less lossy, giant dielectric constant materials with a feasible temperature stability for practical applications. The process for making the materials of the invention appears to represent a donor-acceptor co-substitution into $TiO_2$ rutile. It is thought that the crystal chemical co-substitution principle avoids the appearance of intrinsic defects like oxygen vacancies, cation vacancies and $Ti^{3+}$ interstitial ions. This design principle also provides the ability to control the formation and concentration of $Ti^{3+}$ ions and to accommodate (or release) local strains created by the $Ti^{3+}$ cations and associated structural distortion, which will consequently localise the quasi-free electron from the $Ti^{3+}$ cations, enhance dielectric polarisation, reduce the dielectric loss and improve temperature stability.

The materials of the invention have a general chemical formula of $(A^{3+}, B^{5+})_x Ti_{1-x} O_2$ where $A^{3+}$ is a trivalent transition metal ion such as $Bi^{3+}$, $In^{3+}$, $Ga^{3+}$ or the 3+ ion of a rare earth element, or may be a mixture thereof, and $B^{5+}$ is a pentavalent ion such as $Nb^{5+}$, $W^{5+}$ or $Ta^{5+}$ ions or a mixture thereof. These compounds commonly have a giant dielectric constant, e.g. over 10,000, reasonable dielectric loss and good temperature stability. The process described herein for making these materials includes synthesis procedures and processing conditions required to obtain a high dielectric constant material over 10,000 with a dielectric loss less than 0.3 and a relatively good temperature stability over a broad temperature range, for instance less than 1900 ppm/K over the temperature range from room temperature up to 200° C. Thus the present specification describes the following:

Design strategy: acceptor-donor co-substitution onto the $Ti^{4+}$ sites in $TiO_2$ rutiles according to the chemical formula $(A^{3+}, B^{5+})_x Ti_{1-x} O_2)$. In many, but not all, cases the mole ratio of A to B is equal to 1, that is, the material has formula $(A^{3+}_{0.5-\delta} B^{5+}_{0.5})_x Ti_{1-x} O_2$, and x is such that the material has a rutile structure (e.g. $0<x<0.1$ or $0.0005<x<0.005$) and $\delta$ is between 0 and 0.025 inclusive.

Trivalent ions including, but not limited to, $Al^{3+}$, $Bi^{3+}$, $In^{3+}$, $Ga^{3+}$ and rare earth elements as well as mixtures thereof are candidates for acceptor ions ($A^{3+}$) to be doped into $TiO_2$ rutile.

Pentavalent ions including, but not limited to, $Nb^{5+}$, $Ta^{5+}$, $W^{5+}$ as well as mixtures thereof are candidates as donor ions ($B^{5+}$) to be doped into $TiO_2$.

Pentavalent donor ions including $Nb^{5+}$, $Ta^{5+}$, $W^{5+}$ as well as mixtures thereof may induce the reduction of neighbouring $Ti^{4+}$ ions into $Ti^{3+}$ ions in $TiO_2$ in the absence of neighbouring trivalent acceptor ions $A^{3+}$. The maximum amount of $Ti^{3+}$ ions is therefore controlled by the concentration of dopant pentavalent ions $B^{5+}$.

An approach to synthesise $(A^{3+}_{((4-5n)/3)-\delta} B^{5+}_n)_x Ti_{1-x} O_2$ rutiles, where A=Bi, In, Ga, Al or a rare earth element or mixtures of any two or more of these, B=Nb, W and Ta or mixtures of any two or more of these, including $(In_{0.5-\delta} Nb_{0.5})_x Ti_{1-x} O_2$ by solid state reaction.

A procedure to synthesize dense and well-crystallised $(A^{3+}_{((4-5n)/3)-\delta} B^{5+}_n)_x Ti_{1-x} O_2$ electroceramic pellets by mixing together $A_2 O_3$, $B_2 O_5$ and $TiO_2$ raw oxide powders, pressing the resultant powder into pellets, followed by annealing in a closed furnace over the temperature range from 1350° C.-14507° C.

A procedure to synthesize $In^{3+}$ and $Nb^{5+}$ co-doped $TiO_2$ rutile electroceramics by mixing $In_2 O_3$, $Nb_2 O_5$ and $TiO_2$ oxide powders according to the chemical composition $(In_{0.5-\delta} Nb_{0.5})_x Ti_{1-x} O_2$ required, pressing the resultant powder into pellets, followed by annealing in a closed box furnace at a temperature in the vicinity of 1450° C. for 10 hours to produce dense and well-crystallised ceramic pellets.

An electroceramic as described above, in which the average structure of the resultant material is of the rutile structure type.

An electroceramic as described above in the form of pellets which are single phase.

$(A^{3+}_{((4-5n)/3)-\delta} B^{5+}_n)_x Ti_{1-x} O_2$ electroceramic pellets having high dielectric constants of over 20000 (up to 40000) and dielectric loss of less than 0.3 at ambient temperature over a broad frequency range from 1 kHz to 1 MHz.

$(A^{3+}_{((4-5n)/3)-\delta} B^{5+}_n)_x Ti_{1-x} O_2$ electroceramic pellets having high dielectric constants of over 10000 and dielectric losses of less than 0.3 at ambient temperature over a broad frequency range from 1 kHz to 1 MHz.

$(A^{3+}_{((4-5n)/3)-\delta} B^{5+}_n)_x Ti_{1-x} O_2$ electroceramic pellets having high dielectric constants of over 20000 and dielectric losses of less than 0.15 at ambient temperature at 1 MHz.

$(A^{3+}_{((4-5n)/3)-\delta} B^{5+}_n)_x Ti_{1-x} O_2$ compounds have a positive temperature coefficient of dielectric constant from −100° C. to +200° C.

The $(A^{3+}_{((4-5n)/3)-\delta} B^{5+}_n)_x Ti_{1-x} O_2$ compounds have a temperature coefficient of dielectric constant of 620 ppm/° C. from −170° C. to −20° C., or of no more than 620 ppm/° C. from −170° C. to −20° C.

The $(A^{3+}_{((4-5n)/3)-\delta} B^{5+}_n)_x Ti_{1-x} O_2$ compounds have a temperature coefficient of dielectric constant of 1900 ppm/° C. from room temperature up to 250° C.

The electroceramic materials have a dielectric loss less than 0.3 in the temperature range from room temperature up to 200° C.

The method can be widely used to manufacture all the acceptor-donor co-doped $TiO_2$ rutile materials.

The materials of the invention may be used to make small capacitance components. For instance a single layer capacitor with a diameter of 4.7 mm and a thickness of 0.4 mm can have a capacitance of about 52 nF. This capacitance is over 200 times higher than the same sized pure $TiO_2$ capacitor. Conversely, for the same capacitance, the size of the capacitor (ratio of area to thickness) may be reduced to 0.5% of the corresponding pure $TiO_2$ capacitor.

The temperature stability of these prototype capacitors mostly satisfy the requirement of standard X7R capacitor codes, which presents a significant potential for practical applications. The exact composition of the material with a giant dielectric constant may be optimized according to specific requirements of users (such as temperature stabilisation over a different temperature range or a different dielectric loss requirement).

FIG. 1 shows X-ray diffraction patterns of doped $TiO_2$ rutile at room temperature. The XRD patterns show that the doping does not alter the average rutile structure of $TiO_2$ for In+Nb doping concentrations in the range of 0.05% to 5%. With increasing dopant concentration, the patterns slightly shift towards lower angle. As this decrease in angle generally indicates an increase in unit cell parameters, this may provide evidence that $In^{3+}$ and $Nb^{5+}$ ions substitute for $Ti^{4+}$ within the lattice, as the average radius of $In^{3+}+Nb^{5+}$ is larger than $Ti^{4+}$.

Figure 2:
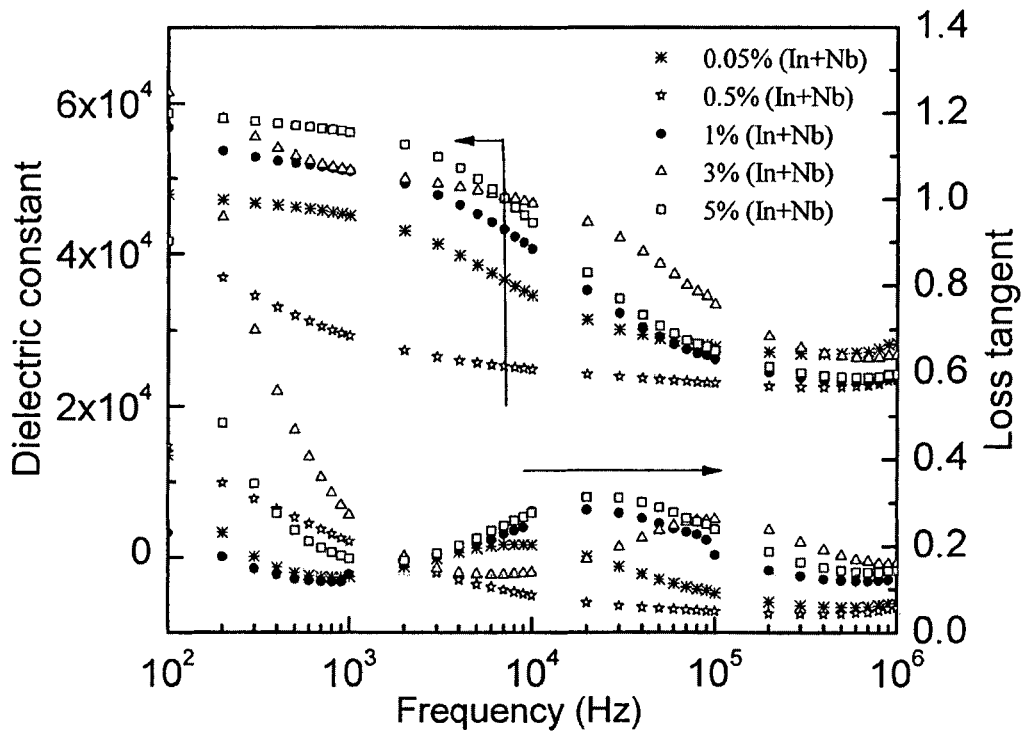
FIG. 2 shows the dielectric frequency spectra of In+Nb doped $TiO_2$ at room temperature.

FIG. 2 shows the dielectric frequency spectra of In+Nb doped $TiO_2$ at room temperature. From this figure, it can be seen that the dielectric polarisation in the lower frequency range arises from space charges that can contribute to electronic or ionic conductive behaviour. As a result, the dielectric constant is higher but slightly decreases while the loss decreases significantly with the increasing the frequency. Debye-type dielectric polarisation relaxation is also observed in the frequency range over 1 KHz, where the dielectric constant has a decreasing step but there are dielectric loss peaks in corresponding frequency range. Both dielectric constant and loss show less dependence on the frequency in higher frequency range close to 1 MHz, suggesting that this type of material may be suitable for use in high frequency energy storage.

Figure 3:
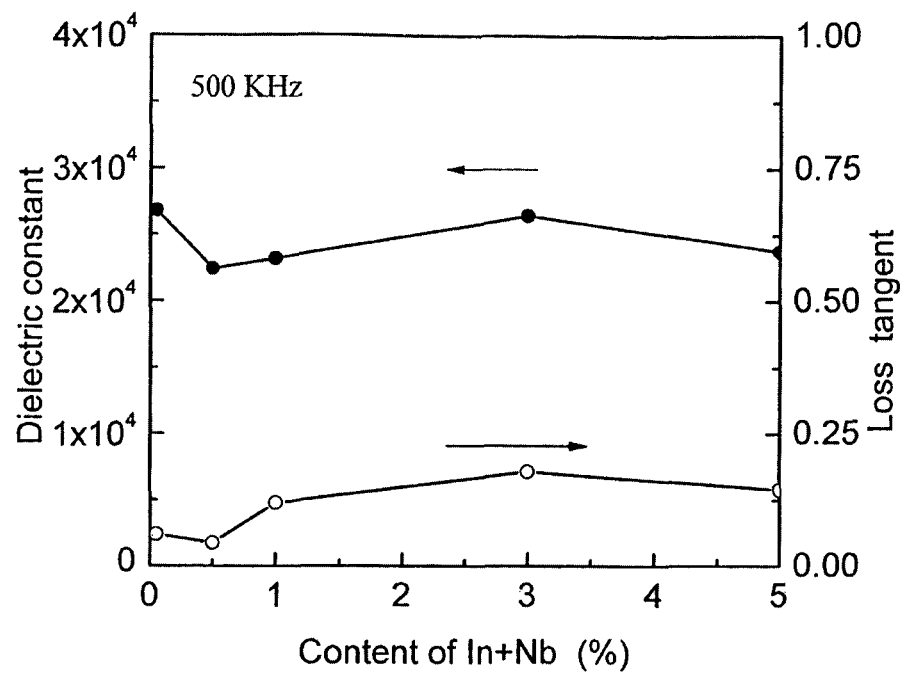
FIG. 3 shows the dielectric constant and loss tangent of In+Nb doped $TiO_2$ with respect to dopant concentration.

FIG. 3 shows the dielectric constant and loss tangent of In+Nb doped $TiO_2$ with respect to dopant concentration. It is found that the dielectric constant of doped $TiO_2$ is over $2\times10^4$, and the corresponding loss is lower than 0.15 measured at 500 KHz.

Figure 4:
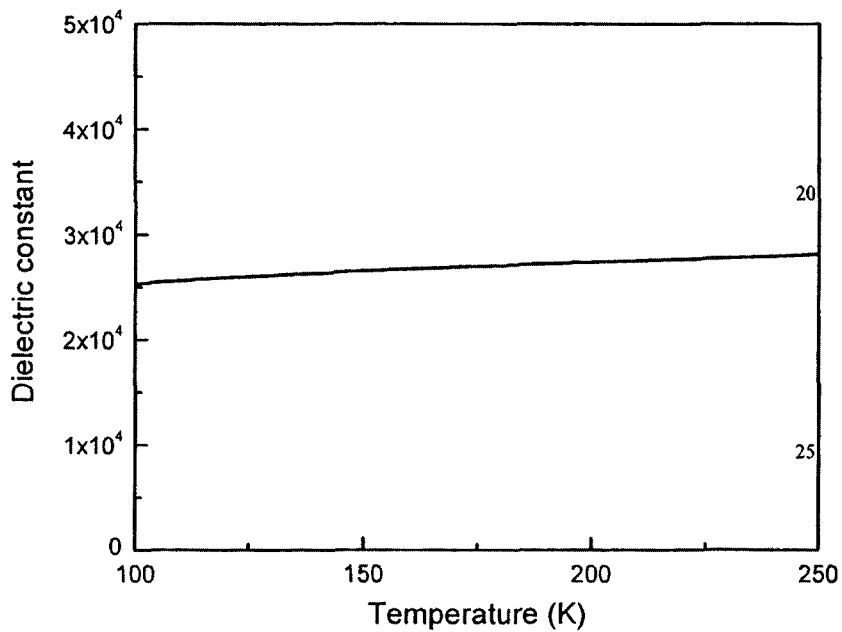
FIG. 4 shows a typical curve that describes the relation between dielectric constant and temperature for In+Nb doped $TiO_2$ below room temperature range.

FIG. 4 shows a typical curve that describes the relation between dielectric constant and temperature below the room temperature range. It is clear that doped $TiO_2$ keeps its high dielectric substantially constant across the measured temperature range. Its temperature coefficient of dielectric constant is less than about 650 ppm/° C. over the range of about −170° C. to about −20° C.

FIG. 5 shows the dielectric constant (a) and loss (b) of In+Nb doped $TiO_2$ at temperatures above room temperature. These curves indicate that the doped $TiO_2$ has extremely week temperature dependence in the temperature range from room temperature to about 200° C., suggesting its excellent temperature stability (the temperature coefficient of dielectric constant is approximately less than 0.2%) and high energy storage ability. In FIG. 5, the different curves represent data obtained at different frequencies. The solid curves were measured at 1 kHz, the dashed curves at 10 kHz and the dotted curves at 100 kHz.

Figure 6:
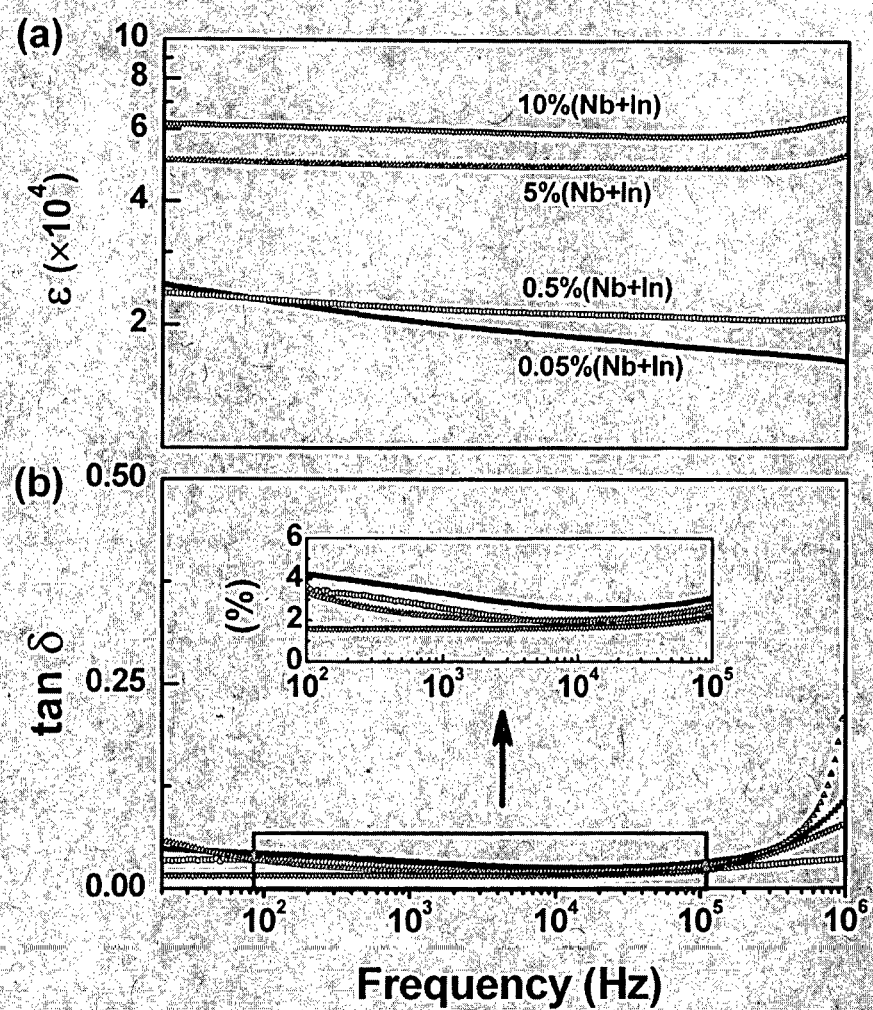
FIG. 6 shows frequency dependent dielectric properties of improved (In+Nb) doped $TiO_2$.

FIG. 6 shows frequency dependent dielectric properties of (In+Nb) doped $TiO_2$ with different (In+Nb)concentration from 0.05% to 0.5% to 5% to 10% after optimisation of the processing conditions and approaches, such as using ball milling, adding additives and varying the annealing temperature and dwelling time, as well as the rising rate of the temperature.

Figure 7:
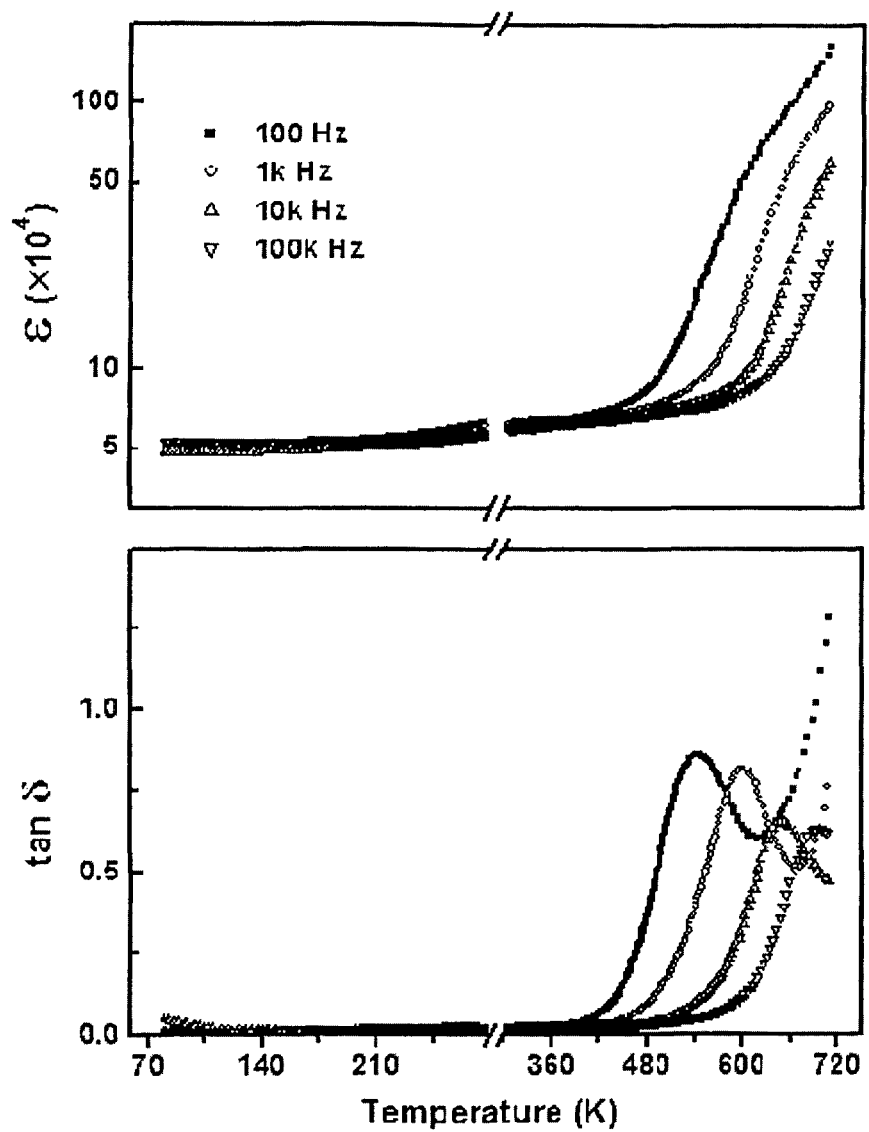
FIG. 7 shows the temperature-dependent dielectric properties of 10% (In+Nb) doped $TiO_2$.

FIG. 7 shows the temperature-dependent dielectric properties of 10% (In+Nb) doped $TiO_2$ after optimisation of the processing conditions and approaches, such as using ball milling, adding additives and varying the annealing temperature and dwelling time, as well as the rising rate of the temperature.

Thus the inventors have developed a material suitable for use in high performance solid state super (ultra) capacitors. There is at present no competing material and related super (or ultra) capacitor product currently in the commercial market place, because all existing giant dielectric constant materials have problems such as high dielectric loss, poor temperature-stability and/or unreproducible processing conditions. Thus the use of the present invention for the development of super (ultra) capacitors has significant commercial potential. Advantages of the present invention include:

Simple host compound and simple processing: $TiO_2$ rutile is a simple compound. For example it only needs 0.05% co-doping of $In^{3+}$ and $Nb^{5+}$ (representing x=0.0005 in the formula $(A^{3+}_{0.5-\delta}B^{5+}_{0.5})_xTi_{1-x}O_2$) to achieve a very high dielectric constant. One step only sintering is sufficient to achieve dense and high quality crystallised samples.

A unique feature of the present invention is that both the temperature coefficient of the dielectric constant as well as the dielectric loss tangent are relatively low, which is a major advantage.

The materials of the invention may be made without use of toxic elements or compounds.

EXAMPLE 1

Figure 5A:
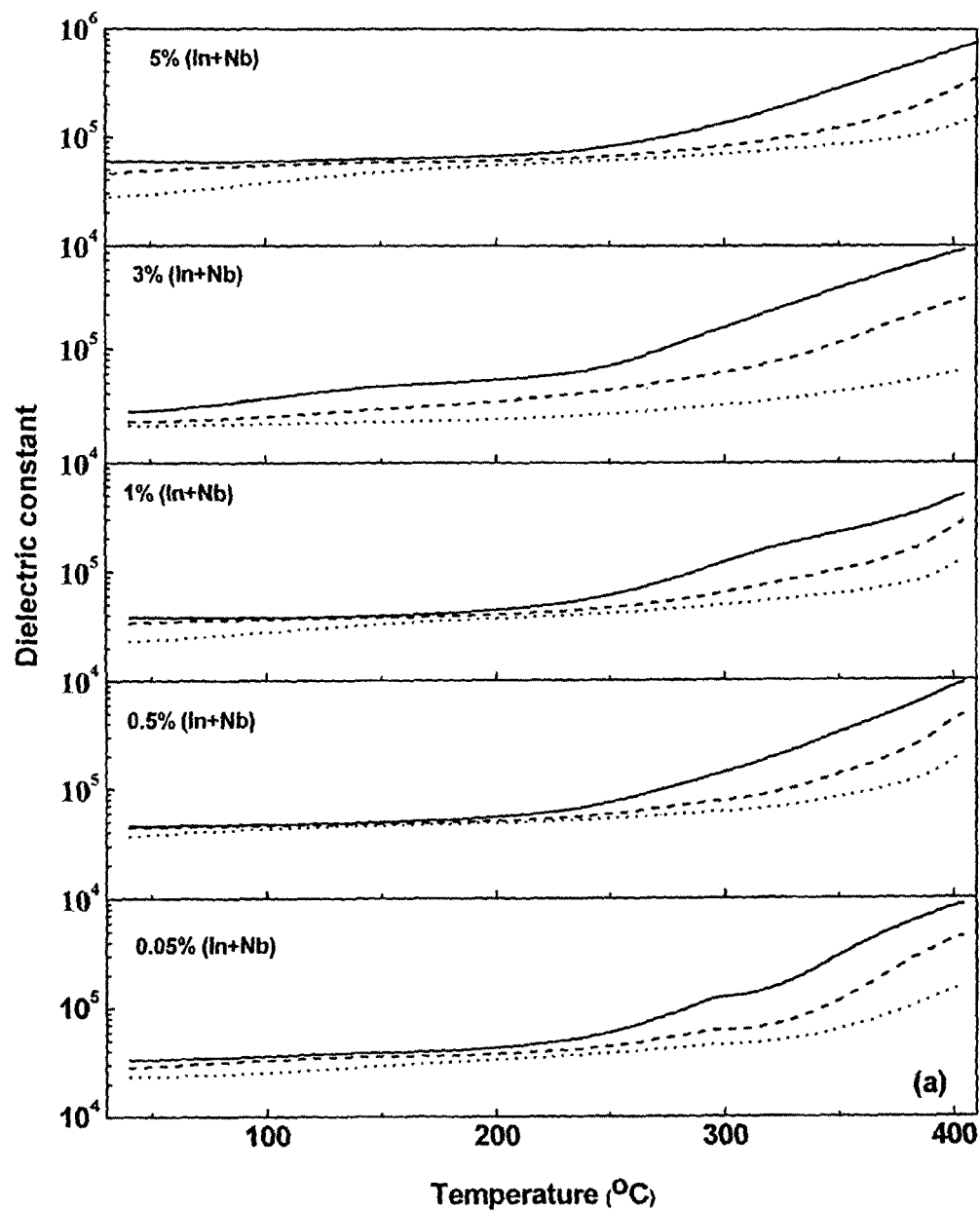
FIG. 5 is a curve of (a) dielectric constant and (b) loss at temperatures above room temperature for various materials according to the invention.
Figure 5B:
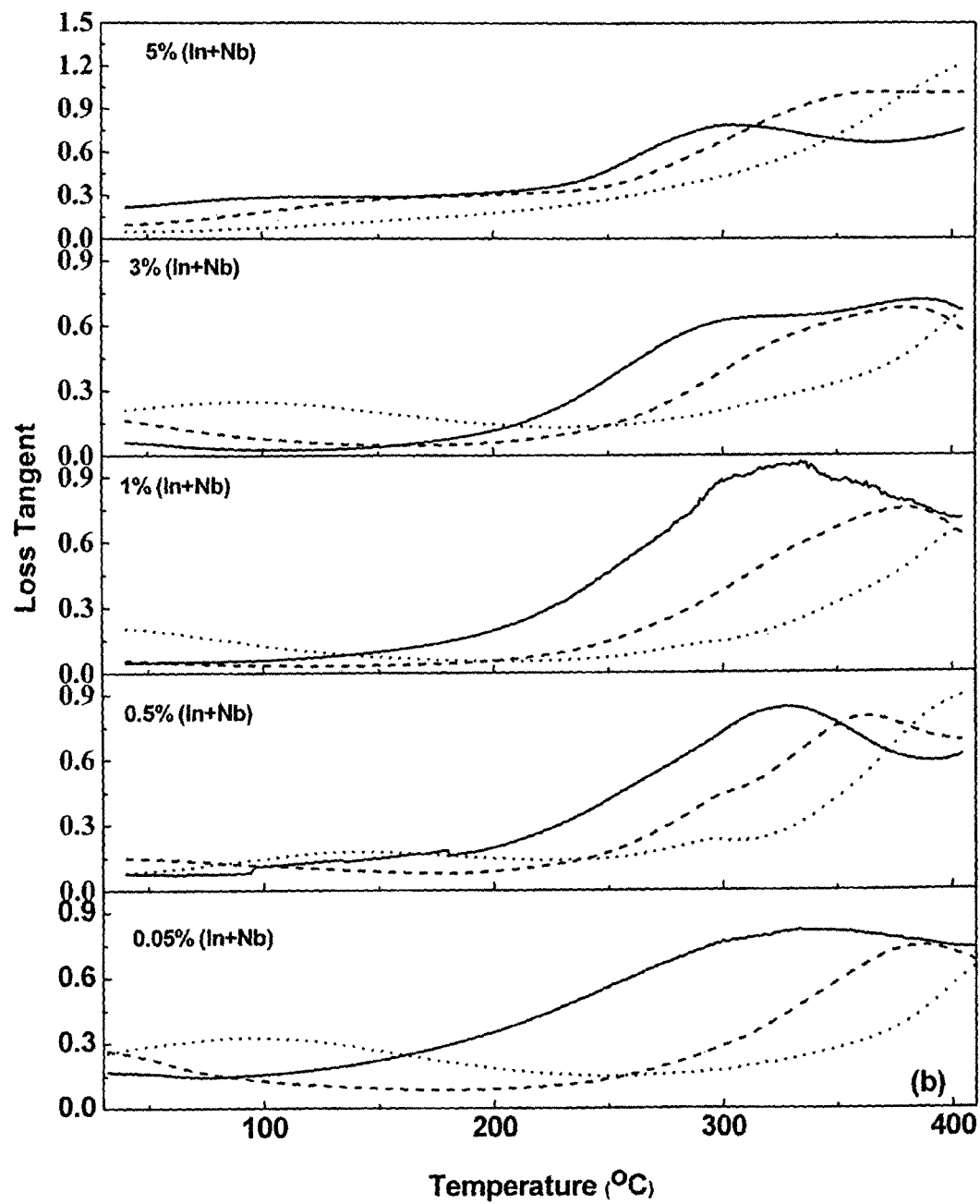

A bulk quantity of each raw reagent was extracted from its storage container and placed into a 150° C. over for a period >12 hours in order to remove any residual traces of $H_2O$. High purity (>99.9%) Indium Oxide ($In_2O_3$), Niobium OXide ($Nb_2O_5$) and $TiO_2$ powders were then weighed into sterile weighing containers in the amounts displayed in Table 1 and vigorously mixed under ethanol, by hand, using an agate mortar and pestle for >15 minutes. The mixed powders were left to dry at room temperature, heat treated at 150° C. for about 1 hour and then inserted into a stainless steel cylindrical die and compacted through the application of about 4.5 metric tonnes pressure to form a cylindrical 'disk' shaped sample of diameter 13 mm. These were sintered in a box furnace at a setting of 1400° C. for 10 hours to form dense, crystalline ceramic pellets. The dielectric constant and dielectric loss curves of these sintered pellets measured over temperatures spanning from ambient room temperature (about 23° C.) to 400° C. are shown in FIG. 5a and FIG. 5b respectively. These figures demonstrate that the samples have a dielectric constant well in excess of $4 \times 10^4$ and an extremely low loss tangent (about 0.15) for high permittivity materials, particularly at temperatures less than 200° C.

TABLE 1

Weighing measurements for Nb and In substituted $TiO_2$

| Sample Description | Total % (In & Nb) | $In_2O_3$ (grams) | $Nb_2O_5$ (grams) | $TiO_2$ (grams) |
| --- | --- | --- | --- | --- |
| $Nb_{(0.00025)}In_{(0.00025)}Ti_{(0.9995)}O_2$ | 0.05 | 0.0003 | 0.0003 | 0.7986 |
| $Nb_{(0.0025)}In_{(0.0025)}Ti_{(0.995)}O_2$ | 0.50 | 0.0035 | 0.0033 | 0.7950 |
| $Nb_{(0.005)}In_{(0.005)}Ti_{(0.99)}O_2$ | 1.00 | 0.0069 | 0.0066 | 0.7910 |
| $Nb_{(0.015)}In_{(0.015)}Ti_{(0.97)}O_2$ | 3.00 | 0.0208 | 0.0199 | 0.7750 |
| $Nb_{(0.025)}In_{(0.025)}Ti_{(0.95)}O_2$ | 5.00 | 0.0347 | 0.0332 | 0.7591 |

EXAMPLE 2

$TiO_2$ (99.99%, crystalizing in rutile was provided by Aldrich Co., $Nb_2O_5$ (99.99%) was provided by Stanford Materials Co. and $In_2O_3$ (99.99%) was provided by Aldrich Co. These were stored at 200° C. to completely remove any adsorbed water. The ceramics of (Nb+In) co-doped rutile $TiO_2$ [formula: $(In_{0.5}Nb_{0.5})_xTi_{1-x}O_2$] were prepared by conventional solid state methods, similar to the process described in Example 1 apart from using ball milling to replace hand grinding described in Example 1. Here, x is the doping level of Nb and In. Synthesis conditions for final ceramics were optimized to 1400° C. for the annealing temperature, 10 h for the duration time and 2° C./min for rising rate. The same synthesis procedure was also used for other samples where the In was replaced by either Al, or Ga or Sc. The only difference was that the annealing temperature was optimised for different elements.

High permittivity with relatively low dielectric loss was achieved due to the formation of local electron-pinned defect-dipoles via a simultaneous incorporation of donor Niobium (Nb) and acceptor Indium (In) into rutile $TiO_2$ host, i.e. $(In_{0.5}Nb_{0.5})_xTi_{1-x}O_2$. An extremely low doping level of (Nb+In) was found to give rise to very large permittivity at room temperature, e.g. for 0.05% (Nb+In) dopants, the permittivity was as high as about $2 \times 10^4$, while the dielectric loss (tan δ) was below 0.05. Higher doping levels make the permittivity nearly frequency-independent whilst keeping tan δ still below 0.04, especially about 0.02 for 10% (Nb+In) dopants in a broad frequency range, even though the permittivity had already incrementally increased up to about $6 \times 10^4$. However, a doping level of beyond 10%, e.g. 20%, led to the appearance of interfacial polarization which dominates the relatively high dielectric loss, and also the huge increase in low-frequency permittivity due to the appearance of the second impurity phase.

Another important consequence of the formation of electron-pinned defect-dipoles was that the colossal permittivity and dielectric loss (tan δ), showed nearly temperature independent across the range of 80K to 450K. No low-temperature dielectric relaxations were detected even when the temperature dropped close to liquid nitrogen temperature.

EXAMPLE 3

Figure 8:
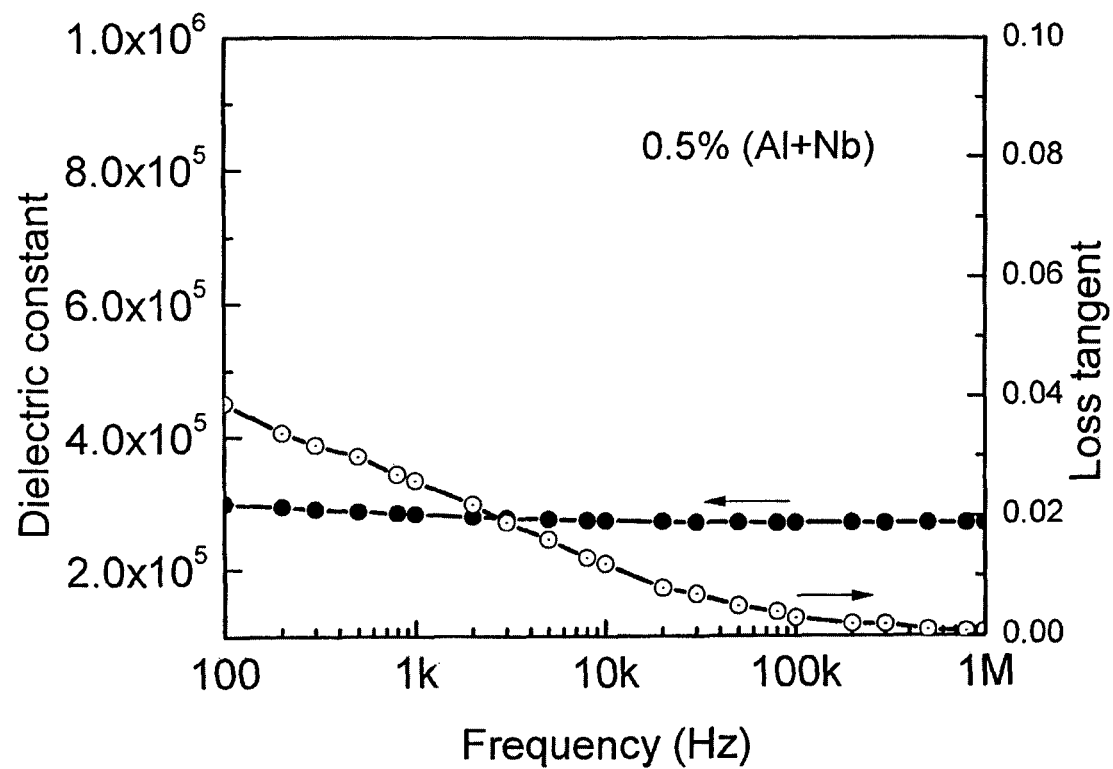
FIG. 8 shows frequency dependent dielectric permittivity and loss of $(Al_{0.5}Nb_{0.5})_xTi_{1-x}O_2$ with x=0.5% annealed at 1500° C. for 5 hours.

$(Al_{0.5}Nb_{0.5})_xTi_{1-x}O_2$ with x=0.5% was annealed at 1500° C. for 5 hours. FIG. 8 shows the to frequency dependent dielectric permittivity and loss of the resulting product. A high dielectric permittivity over 300,000 was achieved with overall loss less than 0.05 in a broad frequency range at room temperature.

EXAMPLE 4

Figure 9:
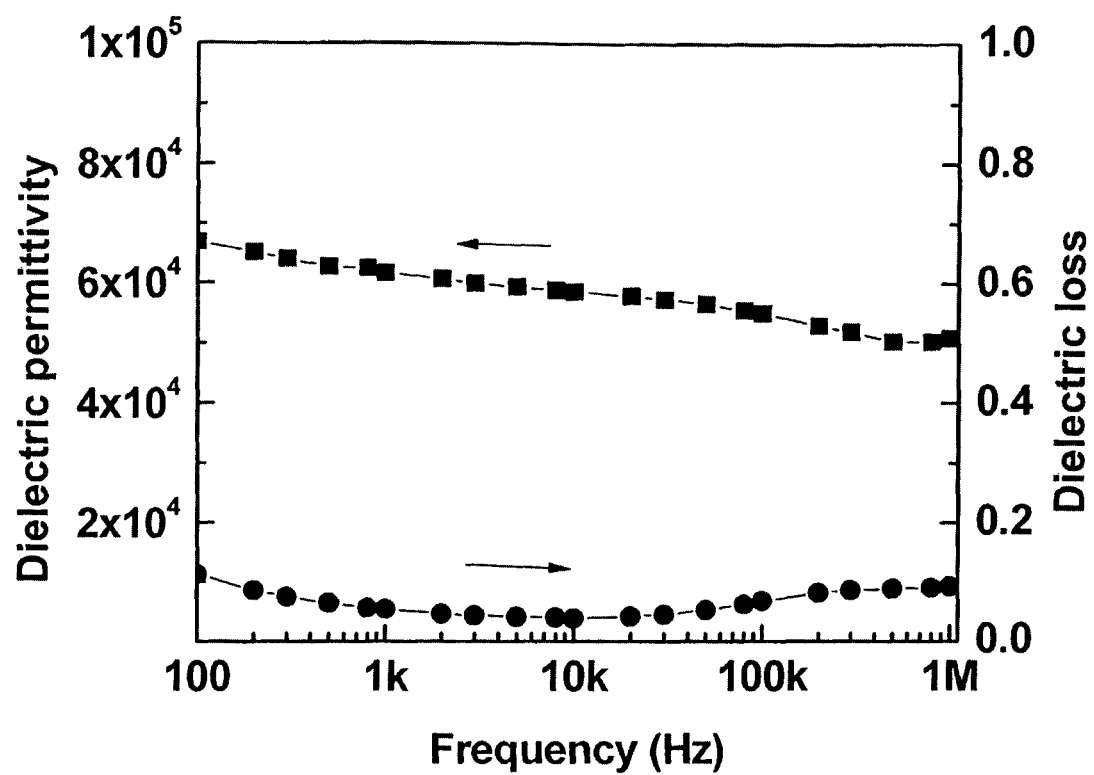
FIG. 9 shows frequency dependent dielectric permittivity and loss of $(Al_{0.083}Nb_{0.75})_xTi_{1-x}O_2$ with x=0.5% was annealed at 1500° C. for 4 hours.

$(Al_{0.08}Nb_{0.75})_xTi_{1-x}O_2$ with x=0.5% was synthesized at 1500° C. for 4 hours. FIG. 9 is shows the frequency dependent dielectric permittivity and loss of this product, giving the dielectric permittivity over 10,000 and loss less than 0.1.

We claim:

1. A material having formula $(A^{3+}_{((4-5n)/3)-\delta}B^{5+}_n)_xTi_{1-x}O_2$, wherein 0<x<0.2 and x is such that the material has a rutile structure, 0<n<0.8, δ is between 0 and 0.025 inclusive, $A^{3+}$ is a trivalent positive ion and $B^{5+}$ is a pentavalent positive ion.

2. The material of claim 1 wherein n is 0.5.

3. The material of claim 1 which has a dielectric constant of greater than about 10,000.

4. The material of claim 1 which has a dielectric loss of less than about 0.3 at about 20° C.

5. The material of claim 4 wherein the dielectric loss of less than about 0.3 applies over a temperature range from about 20° C. to about 200° C.

6. The material of claim 4 wherein the dielectric loss of less than about 0.3 is maintained over a frequency range of about 100 Hz to about 1 MHz.

7. The material of claim 1 having a temperature coefficient of its dielectric constant of less than or equal to about 1900 ppm/° C. over a range of about 20° C. to about 250° C.

8. The material of claim 1 having a positive temperature coefficient of its dielectric constant over a range of about −100° C. to about +200° C.

9. The material of claim 8 having a temperature coefficient of the dielectric constant of less than about 650 ppm/° C. over the range of about −170° C. to about −20° C.

10. The material of claim 1 wherein A is selected from the group consisting of $Bi^{3+}$, $In^{3+}$, $Ga^{3+}$, $Al^{3+}$, $Cr^{3+}$, $Co^{3+}$ and $Fe^{3+}$, trivalent positive ions of rare earth elements and mixtures of any two or more of these.

11. The material of claim 1 wherein B is selected from the group consisting of $Nb^{5+}$, $Ta^{5+}$, $W^{5+}$, $V^{5+}$, $Mo^{5+}$, $Sb^{5+}$ and mixtures of any two or more of these.

12. The material of claim 1 which is $(In_{0.5-\delta}Nb_{0.5})_xTi_{1-x}O_2$.

13. The material of claim 1 which is in the form of pellets.

14. The material of claim 13 wherein each pellet is a single phase pellet.

15. A process for making a material of formula $(A^{3+}_{((4-5n)/3)-\delta}B^{5+}_n)_xTi_{1-x}O_2$, wherein 0<x<0.2 and x is such that the material has a rutile structure, 0<n<0.8, δ is between 0 and 0.025 inclusive, $A^{3+}$ is a trivalent positive ion and $B^{5+}$ is a pentavalent positive ion, said process comprising:
 mixing $A_2O_3$, $B_2O_5$ and $TiO_2$ to form a mixture,
 compressing the mixture to form pellets, and
 annealing the pellets at a temperature of between about 1300 to about 1500° C. to form the material of formula $(A^{3+}_{((4-5n)/3)-\delta}B^{5+}_n)_xTi_{1-x}O_2$.

16. The process of claim 15 wherein n is 0.5.

17. The process of claim 15 wherein the molar ratio of $A_2O_3$ to $B_2O_5$ is about 1:1 and the molar ratio of $A_2O_3$ plus $B_2O_5$ to $TiO_2$ is about (0.5x):(1-x).

18. The process of claim 15 which is conducted in the solid state.

19. The process of claim 15 wherein the annealing is conducted in a closed furnace.

20. The process of claim 15 wherein A is In, B is Nb and the step of annealing is conducted at about 1450° C. for about 10 hours, whereby the process makes $(In^{3+}_{0.5-\delta}Nb^{5+}_{0.5})_xTi_{1-x}O_2$.

21. A capacitor comprising a material having formula $(A^{3+}_{((4-5n)/3)-\delta}B^{5+}_n)_xTi_{1-x}O_2$, wherein 0<x<0.2 and x is such that the material has a rutile structure, 0<n<0.8, δ is between 0 and 0.025 inclusive, $A^{3+}$ is a trivalent positive ion and $B^{5+}$ is a pentavalent positive ion.

\* \* \* \* \*